Jan. 24, 1956
J. M. WELCH
2,732,221
HAND PROPELLED VEHICLE
Filed July 15, 1952
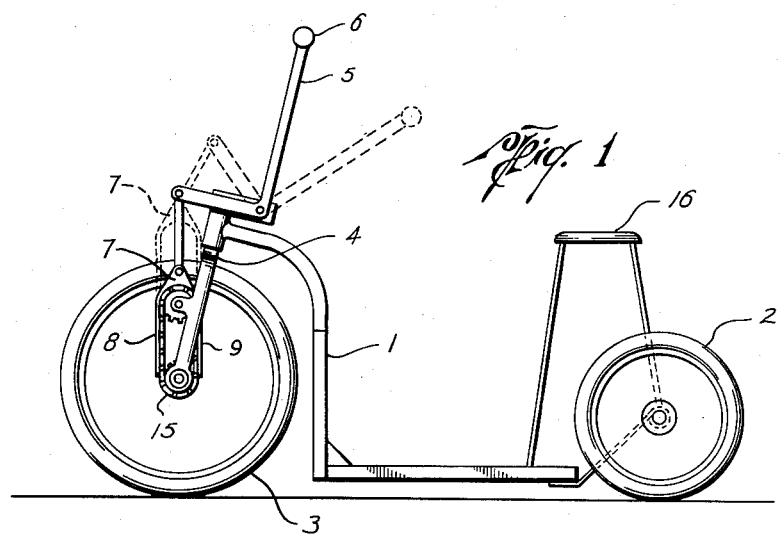
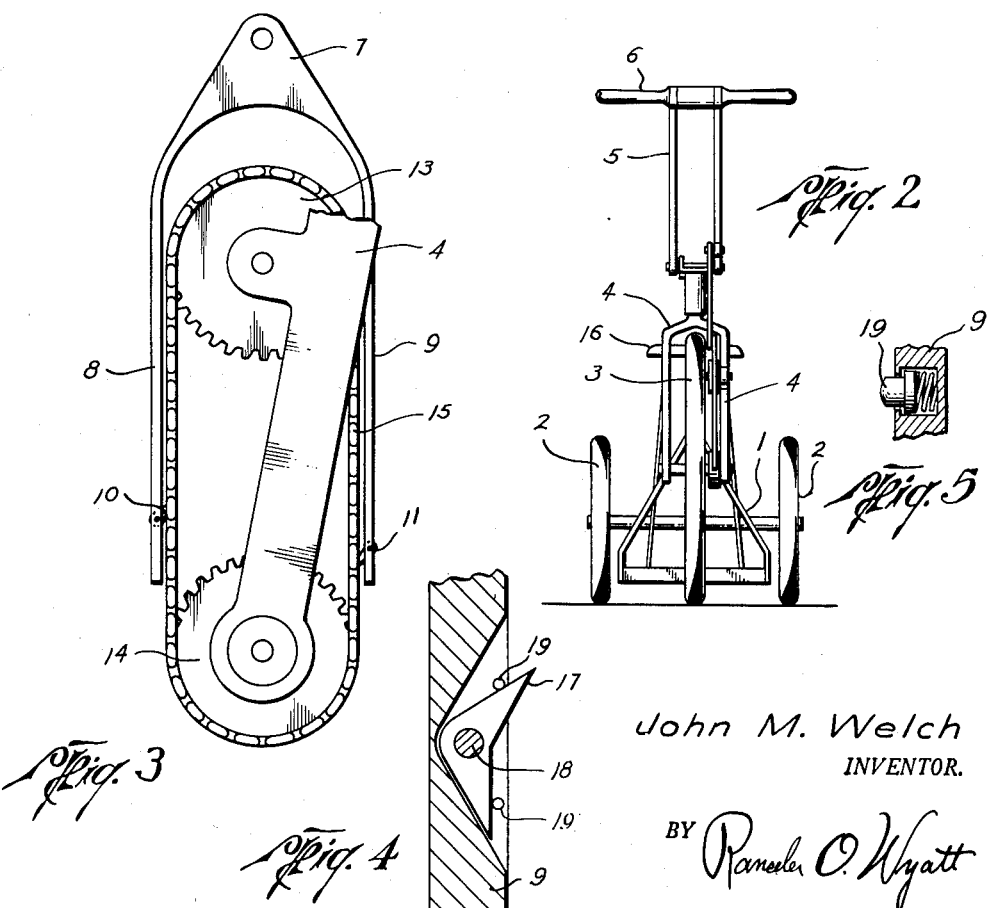
John M. Welch
INVENTOR.
BY Raneeler O. Wyatt
ATTORNEY

United States Patent Office 2,732,221
Patented Jan. 24, 1956

2,732,221
HAND PROPELLED VEHICLE

John M. Welch, Nacogdoches, Tex.; Veva M. Crouch, executrix of said John M. Welch, deceased Application July 15, 1952, Serial No. 298,952

1 Claim. (Cl. 280—246)

This invention relates to new and useful improvements in a hand driven vehicle.

It is an object of this invention to provide a vehicle adapted for manual propulsion that may be easily operated, providing novel means of imparting a continuous thrust to the driven wheel of the vehicle.

It is another object of the invention to provide a hand driven vehicle that may be manufactured of comparatively few parts, providing a more economical and more efficient product.

With the above and other objects in view, the invention has relation to certain features of construction and operation more particularly described in the following specification and illustrated in the accompanying drawing, wherein:

Figure 1 is a side elevational view of the invention.

Figure 2 is a front elevational view.

Figure 3 is a side elevational view of the driving mechanism, greatly enlarged.

Figure 4 is a cross sectional view of another form of dog employed to provide a reversing mechanism, and Figure 5 is a partial side elevational view, illustrating the spring loaded stop means employed.

Referring now more particularly to the drawings, the numeral 1 indicates a vehicle framework having the usual supporting wheels 2, 2, and the front wheel 3. A pivotal fork 4 is mounted on the framework 1 and supports the front wheel 3. A bell-crank 5 is pivotally mounted on the fork 4, one end of the bell-crank 5 having a hand grip 6 and the other end of the bell-crank 5 having a pivotal connection with the driving fork 7. The depending arms 8, 9 of the driving fork 7 have the dogs 10, 11 mounted on the inside vertical walls thereof, one of said dogs being directed downwardly and the other being directed upwardly, said dogs being preferably tapered, or wedge shaped, and being preferably formed of a semi-rigid material, such as a spring steel.

Rotatably mounted on the fork 4 are the vertically aligned toothed driving wheels 13, 14. A belt, or linked chain, 15, is mounted on the wheels 13, 14, and the wheel 14 is in fixed coaxial relationship with the front wheel 3.

A user of the vehicle seats himself on a suitable seat, as 16, on the framework and actuates the bell-crank 5 by means of the hand grip 6. This raises and lowers the driving fork 7 and the respective dogs 10 and 11 alternately engage the linked belt 15, the dog 10 dropping into one of the links of the belt on the upstroke and riding over the belt on the downstroke or when in a coasting position and the dog 11 engaging a link of the belt on the down stroke and riding over the belt on the upstroke or while coasting. The dogs 10, 11 are not in exact horizontal alignment so that the idling dog may be engaged immediately upon disengagement of the working dog. The rotation of the wheels 13, 14, of course, in turn rotate the front wheel 3 and provide means of propulsion of the vehicle.

Figure 4 shows a form of dog 17 that will permit reversal of the direction of rotation of the wheels 13, 14 and consequently the wheel 3. This dog 17 is pivotally mounted as at 18 and has spring loaded stops 19 of conventional construction, designed to yieldingly maintain the dog in the desired position. When it is desired to reverse the direction of rotation of the wheels 13, 14, the dog 17 is pivoted manually from one position to the other.

This device is particularly adapted to wheeled vehicles such as wheel-chairs and the like, and it is contemplated that the driving means may be applied to any wheel of the vehicle.

While the foregoing is considered a preferred form of the invention, it is by way of illustration only, and the broad principles of the invention will be defined by the appended claim.

What I claim is:

In a hand driven vehicle, a framework, wheels on said framework, one of said wheels being a driven and a steering wheel, a steering fork on said framework, a bell-crank pivotally mounted on said steering fork and having a hand grip at one end and a pivotally mounted driving fork connected at the other end by a link, said driving fork having depending arms, a pair of driving wheels in vertical alignment on said steering fork, one of said wheels being coaxially secured to the driven wheel on said vehicle, a belt connecting said driving wheel, dogs on the depending ends of said driving fork arms, means on said belt adapted to be engaged by one of said dogs when said driving fork is moved in either direction and stops on said driving fork arms for yieldingly maintaining each of said dogs in a forward or reverse position.

References Cited in the file of this patent

UNITED STATES PATENTS

| | | |
|---|---|---|
| 375,961 | Steffa | Jan. 3, 1888 |
| 507,583 | Gratiot | Oct. 31, 1893 |
| 968,355 | Hopkins | Aug. 23, 1910 |
| 1,140,167 | Kolb et al. | May 18, 1915 |
| 1,231,377 | Kawalle | June 26, 1917 |
| 1,598,855 | Dunlop | Sept. 7, 1926 |
| 2,123,390 | Welch | July 12, 1938 |

FOREIGN PATENTS

| | | |
|---|---|---|
| 501,606 | France | Jan. 31, 1920 |
| 777,896 | France | Dec. 15, 1934 |
| 910,213 | France | Jan. 21, 1946 |
| 68,306 | Germany | Apr. 27, 1893 |